(12) United States Patent
Howell et al.

(10) Patent No.: US 6,542,119 B2
(45) Date of Patent: Apr. 1, 2003

(54) GPS ANTENNA ARRAY

(75) Inventors: Robert M. Howell, Burlington, IA (US); Timothy J. Stevenson, Vista, CA (US)

(73) Assignee: Varitek Industries, Inc., Houston, TX (US)

( * ) Notice: Subject to any disclaimer, the term of this patent is extended or adjusted under 35 U.S.C. 154(b) by 0 days.

(21) Appl. No.: 09/863,956

(22) Filed: May 23, 2001

(65) Prior Publication Data

US 2002/0044085 A1 Apr. 18, 2002

Related U.S. Application Data

(60) Provisional application No. 60/206,343, filed on May 23, 2000.

(51) Int. Cl.[7] .............................. H04B 7/185; G01S 5/14
(52) U.S. Cl. .................. 342/374; 342/357.06; 701/215
(58) Field of Search ..................... 342/357.06, 357.12, 342/374; 701/213, 215

(56) References Cited

U.S. PATENT DOCUMENTS

| | | | | |
|---|---|---|---|---|
| 2,422,026 A | | 6/1947 | Luck | |
| 4,845,507 A | * | 7/1989 | Archer et al. ................ | 343/754 |
| 5,047,715 A | | 9/1991 | Morgenstern ............... | 343/742 |
| 5,258,766 A | | 11/1993 | Murdoch ..................... | 343/742 |
| 5,334,987 A | * | 8/1994 | Teach .......................... | 342/357 |
| 5,410,321 A | * | 4/1995 | Gordon et al. .............. | 342/374 |
| 5,552,798 A | | 9/1996 | Dietrich et al. ...... | 343/700 MS |
| 5,657,024 A | * | 8/1997 | Shingyoji et al. ........... | 342/175 |
| 5,818,393 A | | 10/1998 | Fowler et al. .............. | 343/853 |
| 6,069,564 A | | 5/2000 | Hatano et al. .............. | 343/742 |
| 6,075,486 A | | 6/2000 | Hakozaki ............. | 343/700 MS |
| 6,094,173 A | | 7/2000 | Nylander ..................... | 343/742 |
| 6,121,925 A | * | 9/2000 | Hilliard ....................... | 342/432 |

FOREIGN PATENT DOCUMENTS

DE 1927146 3/1970

* cited by examiner

*Primary Examiner*—Dao Phan
(74) *Attorney, Agent, or Firm*—William W. Cochran, II

(57) ABSTRACT

Disclosed is a system for using an antenna array in conjunction with a GPS receiver to receive GPS satellite transmissions. A switching circuit, under the control of a GPS controller, can vary the sampling rate of multiple antennas in the antenna array to ensure that multiple satellite information is acquired. The device of the present invention can be implemented in handheld cell phones, personal data assistants, telemetric devices or any device using a GPS receiver that may be used in various orientations so as to receive GPS satellite transmissions from multiple directions. More highly directional antennas can be employed having higher gain since the antenna array can receive satellite data from multiple orientations.

10 Claims, 4 Drawing Sheets

GPS ANTENNA ARRAY

CROSS REFERENCE TO RELATED APPLICATIONS

The present invention claims the benefit of U.S. Provisional Application Serial No. 60/206,343 filed May 23, 2000, entitled "GPS Antenna Array" by Robert M. Howell and Timothy J. Stevenson.

BACKGROUND OF THE INVENTION a. Field of the Invention

The present invention generally pertains to antennas and more particularly to the use of multiple antennas for detecting GPS signals.

b. Description of the Background

GPS signals that are broadcast from satellites in stationary orbits are used by GPS receivers for generating location data to locate the receiver. More accurate location information can be generated as more satellites are detected.

In certain environments, satellite signals may be difficult to detect. For example, in urban areas, large buildings may block the reception of certain satellite signals. In this case, the GPS receiver may have a narrow satellite view and be able to only detect satellites in certain predetermined directions. Further, high foliage areas and other environmental effects may limit the direction in which satellite information can be detected. For example, telemetric devices may be used to track the location of a car. If a car is in an accident and turned over or sideways, a single GPS antenna may not be able to detect any satellite information because of the directional nature of the GPS antenna. The telemetric device would then be rendered useless. Additionally, objects may be stacked or placed on top of a telemetric device, or other GPS receiver, which may block a single GPS antenna from receiving any satellite data. Further, a GPS receiver may be attached to devices that are rotated, such as a cell phone or PDA, or caused to go into a dive, such as airplanes or other devices. The directional nature of the GPS antenna, again, may prevent a single GPS antenna from receiving satellite broadcasts that will allow the GPS device to generate location data. There are numerous scenarios in which this may occur.

It would therefore be advantageous to have a device that is capable of detecting GPS satellite broadcasts in multiple directions that would allow the GPS device to receive satellite broadcasts in various orientations and from different angles when an antenna may otherwise be blocked.

SUMMARY OF THE INVENTION

The present invention overcomes the disadvantages and limitations of the prior art by providing a GPS antenna array that is capable of detecting GPS satellite transmissions in multiple directions. In one embodiment, the present invention may be employed on a telemetric device in which GPS antennas are located on each side of a box holding the telemetric device. A relay switching array can be used to switch from one antenna to the next so that satellite information can be received from multiple antennas. The relay may cycle through each of the antennas, acquire satellites, process GPS data, store tracing information for each acquired satellite and then proceed to the next antenna. After each of the antennas has been sampled, the positional information can be calculated and stored in the GPS device.

The present invention may therefore comprise a method of detecting GPS satellite data from multiple directions comprising: providing a GPS antenna array having multiple antennas disposed in various orientations; providing a switch that is capable of connecting the multiple antennas to a GPS receiver; controlling the switch so that the GPS satellite data can be detected by the GPS receiver from the multiple antennas.

The present invention may further comprise a method of connecting a multiple GPS antenna array to a GPS receiver so that GPS satellite data can be detected from multiple directions comprising: connecting the GPS receiver to a first antenna of the multiple GPS antenna array; determining if the GPS satellite data can be acquired by the first antenna; detecting the GPS satellite data that can be acquired; switching to a next antenna whenever the GPS satellite data cannot be acquired; storing the GPS satellite data.

The present may further comprise a device for detecting GPS satellite data from multiple directions comprising: a GPS antenna array having multiple GPS antennas that are oriented in multiple directions; a switch that is connected to the GPS antenna array; a GPS receiver coupled to the switch that controls the switch such that the GPS receiver is connected to the multiple GPS antennas to receive the GPS satellite data from multiple directions and changes connections to the multiple GPS antennas whenever the GPS satellite data is not acquired.

The advantages of the present invention are that satellite data can be detected from multiple directions which allows the GPS receiver to detect satellite data in multiple orientations. The GPS antenna array can be disposed on any desired GPS receiver, including telemetric devices, cell phones, PDAs, etc. The directional nature of the GPS antenna can then be maintained to increase reception while not sacrificing the ability to detect satellite data from various directions. For example, if a telemetric device is mounted in an automobile and if that automobile is in a wreck and turned on its side or turned over, the telemetric device employing the present invention will still have one or more antennas that are oriented towards the sky that will enable the telemetric device to receive satellite transmissions.

DETAILED DESCRIPTION OF THE INVENTION

Figure 1:
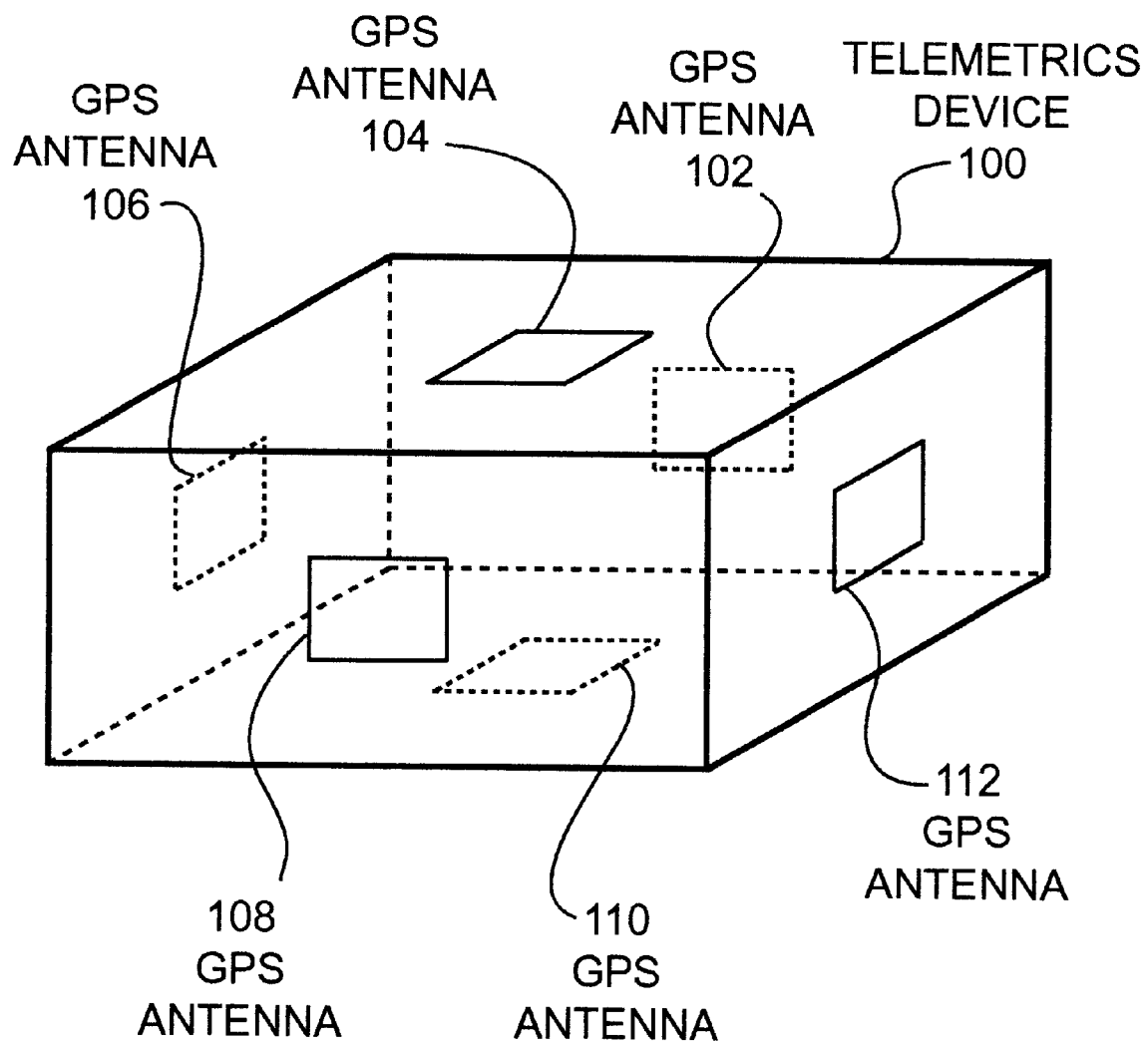
FIG. 1 is a schematic diagram of one implementation of the present invention on a telemetric device.

FIG. 1 is a schematic diagram of one implementation of the present invention on a telemetric device 100. Telemetric devices are used to track property such as automobiles and other motor vehicles. Telemetric devices normally include a GPS receiver together with a cell phone that transmits the location information to a central tracking station. A telemetric device can be used as a handheld device such as a cell phone or may be incorporated as part of a personal data assistant (PDA). Each of these devices may be adjusted or used in various orientations. The telemetric device 100 may therefore include various GPS antennas such as GPS antenna 102, 104, 106, 108, 110, 112 that are disposed on various surfaces of the telemetric device 100. In order for the GPS antennas to have at least a moderate degree of gain, they must be somewhat directional in nature. The more directional the GPS antenna is made, the higher the gain of the antenna. Hence, it is desirable to be able to use an array of GPS antennas that are oriented in various directions such as shown in FIG. 1 that are more directional in nature since these antennas will have a higher degree of gain. This allows the telemetric device 100 to detect GPS satellite transmissions in multiple orientations. For example, if a handheld cell phone is equipped with a GPS receiver, the handheld telephone can be oriented in multiple directions and still be able to receive GPS satellite transmissions with a high degree of gain.

Antenna arrays, of course, have been used previously for detecting signals or transmitting signals from multiple directions. For example, each of the following patents discloses multiple antenna arrays: U.S. Pat. Nos. 5,258,766, 2,422,026, 5,047,715, 5,552,798, 5,818,393, 6,069,564, 6,075,486, 6,094,173, and Offenlegungsschrift U.S. Pat. No. 1,927,146, all of which are specifically incorporated herein by reference for all that they disclose and teach. None of these patents, however, disclose the use of an antenna array with a GPS receiver for receiving GPS satellite transmissions from multiple directions. Further, there is no disclosure of the use of such an array with a telemetric device. Also, these devices do not disclose an integrated switching array and a process for switching between the antennas that allows the GPS receiver to acquire one or more satellites prior to switching to the next antenna and array.

Figure 2:
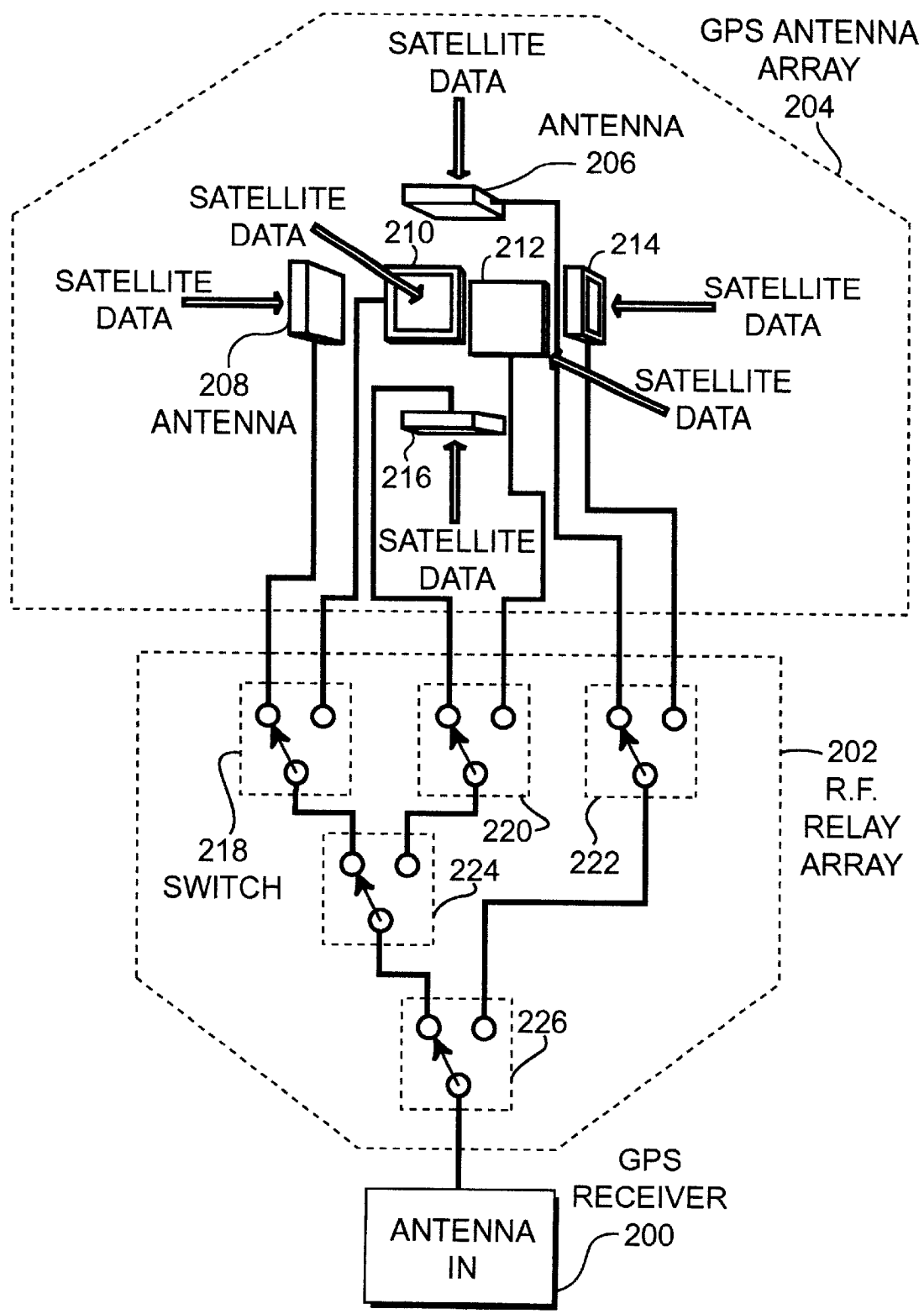
FIG. 2 is a schematic diagram illustrating the manner in which a GPS antenna array may be connected to a GPS receiver.

FIG. 2 is a schematic diagram of one implementation of the present invention. As shown in FIG. 2, a GPS receiver 200 is connected to a RF relay array 202 via the antenna input to the GPS receiver 200. The RF switching relay 202 is in turn connected to a GPS antenna array 204. The GPS antenna array may include multiple antennas such as antennas 206, 208, 210, 212, 214 and 216. These antennas are disposed in six different directions to receive satellite transmissions from six different directions, as illustrated in FIG. 2. Each of the six antennas is then connected to the RF switching relay array 202. The RF switching relay array 202 includes switches 218, 220, 222, 224 and 226. Each of the switches 218–226 is operated under the control of a controller in the GPS receiver 200. Embedded software in the controller of the GPS receiver 200 is programmed to activate the switches 218–226 in accordance with the process described in FIG. 4. The embedded software in the GPS receiver 200 controls the cycling of the sampling of the GPS antenna array in accordance with the satellite data that is received by each one of the antennas 202–216. In addition, the GPS receiver 200 detects and stores the tracing information of each of the acquired satellites from each of the antennas 202–216. The tracing information is then used in the next cycle through the antenna array so that the GPS receiver 200 can predict which satellites it can expect to see. By storing and using tracing information, in this fashion, from a previous scan through the antenna array, acquisition time during the next cycle is shortened.

The system illustrated in FIG. 2 has a sampling rate that is dependent upon the number of satellites acquired by each of the antennas 202–216. For example, if antenna 206 acquires three satellites with valid data, the embedded software of the GPS receiver will pause sufficiently to acquire the satellite data prior to switching to the next antenna. If the next antenna does not acquire any satellite data, the process will switch to the next antenna. This is described more fully with regard to FIG. 4.

As shown in FIG. 2, the antennas 202–216 are oriented in six different directions to receive satellite data. Of course, any number of antennas can be used that are oriented in any desired direction to obtain satellite data from multiple orientations.

Figure 3:
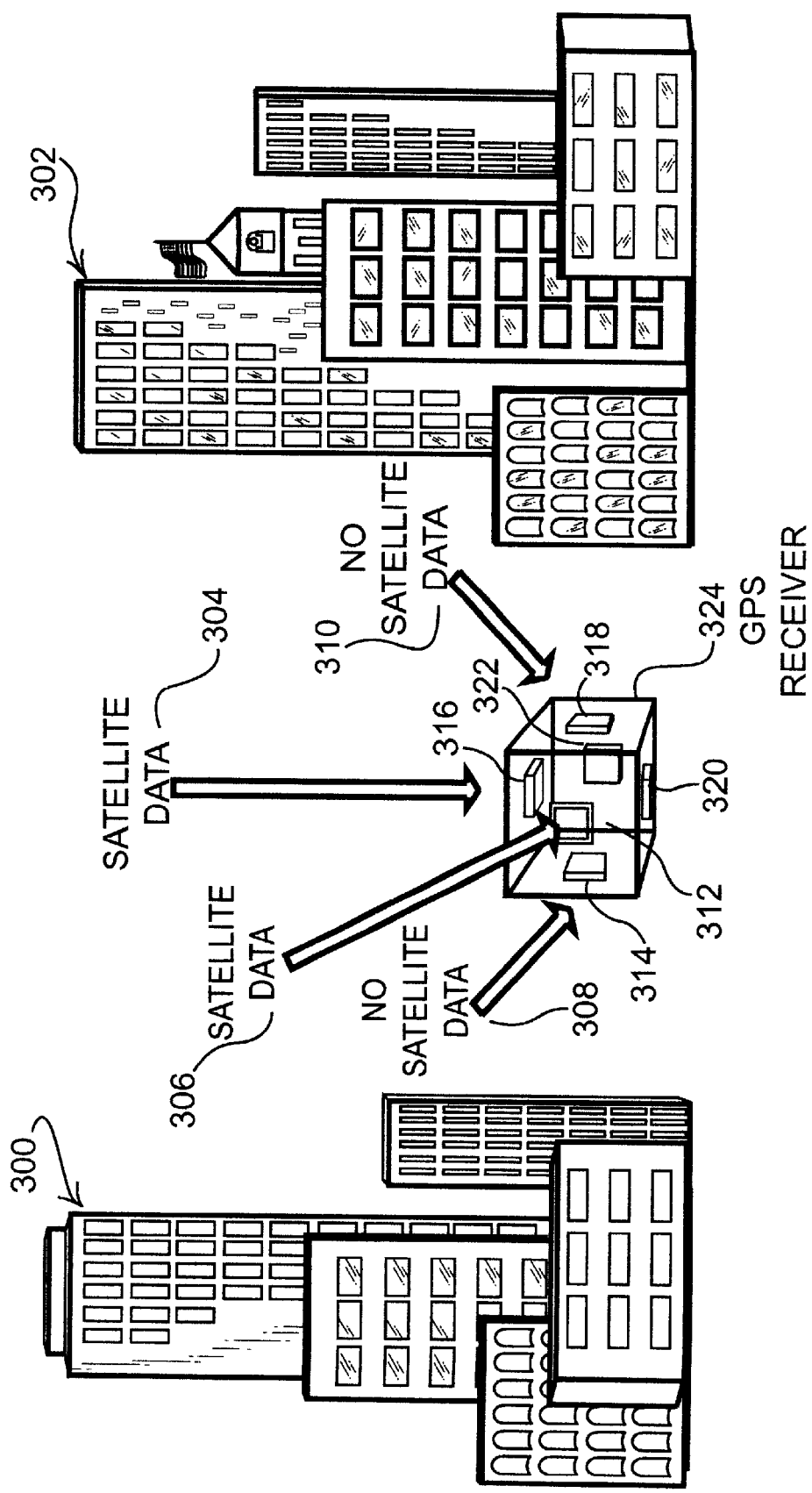
FIG. 3 is a schematic illustration of the use of the present invention in an urban environment.

FIG. 3 is a schematic illustration of the use of the present invention in an urban environment. As shown in FIG. 3, buildings 300, 302 may exist in an urban environment. A GPS receiver 324 can be used in accordance with the present invention that employs multiple antennas 312, 314, 316, 318, 320 and 322 that may be oriented, as shown in FIG. 3, in six different directions. The GPS receiver 324 may comprise a handheld PDA, a cell phone, a telemetric device mounted on a motor vehicle or on a simple GPS receiver such as a handheld GPS receiver. As shown in FIG. 3, satellite data 304 and 306 is detected by antennas 316 and 312, respectively. The other antennas do not detect any satellite data. For example, antenna 314 does not detect any satellite data 308 in the direction of antenna 314. Similarly, antenna 318 does not detect any satellite data 310 in the direction of antenna 318. The urban environment created by the buildings 300, 302 narrows the viewing angle for the satellite data so that only satellite data 304, 306 is transmitted between the buildings 300, 302. The GPS receiver 324 can be oriented in various multiple directions and still be able to receive the narrow angle of satellite data in the urban environment.

Figure 4:
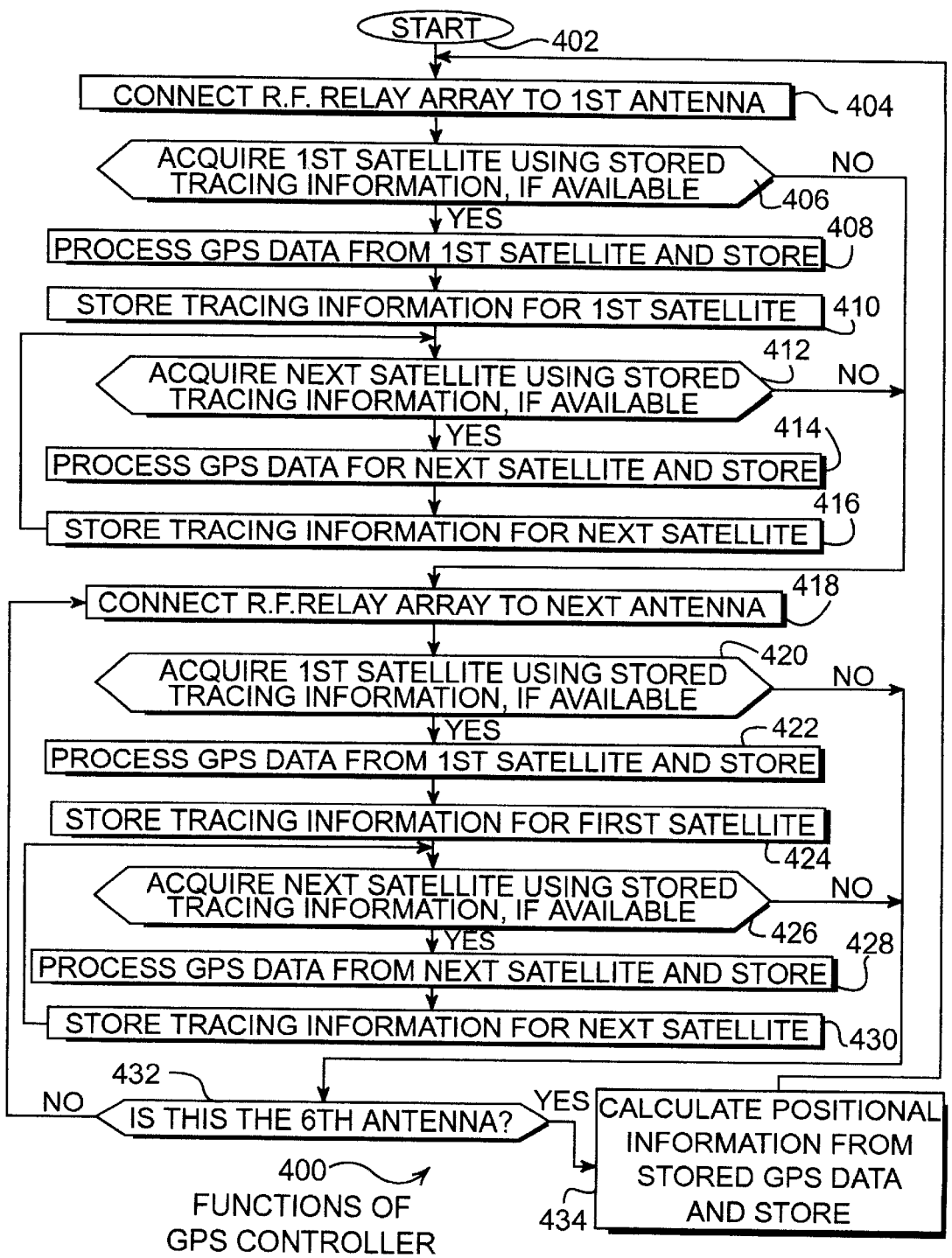
FIG. 4 is a flow chart illustrating the functions of the GPS controller.

FIG. 4 is a flow diagram that illustrates the functions performed by embedded software in a GPS controller. The GPS controller may comprise a microprocessor that is included within the GPS receiver device. The embedded software can be used to control the functions of the microprocessor of the GPS receiver to perform the functions illustrated in FIG. 4. Of course, any desired type of controller or logic device can be employed including a state machine, etc. At step 402, the process is started. At step 404, the radio frequency relay array connects the GPS receiver antenna input, as illustrated in FIG. 2, to the first antenna, such as antenna 208 illustrated in FIG. 2. The RF switch relay array can comprise a separate chip, that is mounted on a GPS receiver board, that is connected to the antenna input of the GPS receiver. Control circuits for the RF relay array can be controlled by output drivers of the microprocessor circuit. At step 406, the GPS receiver determines whether a first satellite has been acquired. A certain predetermined period may be provided to acquire the first satellite. Additionally, stored tracing information as to the satellite may be used by the GPS receiver if available. Tracing information may be stored and available from a previous cycle through the antenna array, for example. If the period for detecting the first satellite has timed out, the process proceeds to step 418. If the first satellite is acquired, the process proceeds to step 408 where the GPS data received from the first satellite is processed and stored. At step 410, tracing information for the first satellite is stored. The process then proceeds to step 412 where the GPS receiver determines if a next satellite can be acquired. Another predetermined period is provided for acquiring the next satellite. Stored tracing information may be used for acquiring the satellite if it is available, in the same manner as described above. If the satellite is not acquired, the process proceeds to step 418. If the next satellite is acquired, the process proceeds to step 414 where the GPS data from the next satellite is processed and stored. Tracing information for the next satellite is stored at step 416. The process then returns to step 412 and the process is repeated.

As also shown in FIG. 4, the GPS receiver determines if a first satellite is acquired using the next antenna at step 420. Again, a predetermined timeout period may be used as described above. Stored tracing information can also be used to acquire the first satellite if it is available. If the first satellite is not acquired within the timeout period, the process proceeds to step 432. If the first satellite is acquired by the next antenna, the process proceeds to step 422 where the GPS data is processed from the first satellite and stored. At step 424, tracing information for the first satellite is stored. The process then proceeds to step 426 where the GPS receiver determines if a next satellite can be acquired during a predetermined period. Again, stored tracing information can be used if available. If the satellite cannot be acquired within the predetermined timeout period, the process proceeds to step 432. If the next satellite is acquired, the process proceeds to step 428 where the GPS data is processed from the next satellite and stored. The process then proceeds to step 430 to store the tracing information from the next satellite. The process returns to step 426 to see if the next satellite can be acquired. At step 432, the GPS receiver determines if the antenna is the sixth antenna. If it is not, the process returns to step 418 to connect the RF relay array to the next antenna. If it is the sixth antenna, the process may then proceed to step 434 where the positional information is calculated from the stored GPS data. The positional information is then stored by the GPS receiver and used as desired.

The process illustrated in FIG. 4, of course, can be varied and does not necessarily need to be processed in the order illustrated above. The functions described by the GPS controller, as described with regard to FIG. 4, allow the sampling period to be adjusted for each of the individual antennas depending upon the acquisition of GPS satellite transmissions and the processing of that data. Sampling may proceed at a much higher rate if fewer satellites are acquired. In any event, the entire cycle time for six antennas should not exceed approximately one second.

The present invention therefore provides a unique system for using a multiple antenna array that samples GPS antennas at varying rates depending upon the acquisition of satellite transmissions. The system of the present invention allows GPS data to be detected when the GPS receiver is oriented in various directions and allows the use of more directional type antennas with higher gain for better reception. Cycle time for sampling each of the antennas can vary in accordance with acquisition of satellite transmissions. The antenna array can be designed in any desired orientation to receive GPS satellite transmissions from multiple orientations. This can be useful in cell phone devices having GPS receivers, PDAs having GPS receivers and other telemetric devices that may acquire multiple orientations.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method of detecting GPS satellite data from multiple directions comprising:

providing a GPS antenna array having multiple antennas disposed in various orientations;

providing a switch that is capable of connecting said multiple antennas to a GPS receiver;

determining which GPS antenna of said GPS antenna array can acquire said GPS satellite data;

controlling said switch so that said GPS antenna is connected to said GPS receiver to detect said GPS satellite data;

storing said GPS satellite data;

controlling said switch so that said GPS receiver is connected to another GPS antenna so as to acquire additional satellite data.

2. A method of connecting a multiple GPS antenna array to a GPS receiver so that GPS satellite data can be detected from multiple directions comprising:

connecting said GPS receiver to a first antenna of said multiple GPS antenna array;

determining if said GPS satellite data can be acquired by said first antenna;

detecting said GPS satellite data that can be acquired;

switching to a next antenna whenever said GPS satellite data cannot be acquired;

storing said GPS satellite data.

3. The method of claim 2 wherein said multiple GPS antenna array has multiple GPS antennas that are disposed in different directions.

4. The method of claim 2 further comprising:

detecting tracing information related to satellites that transmit said GPS satellite data;

storing said tracing information for later use in acquiring said satellites.

5. The method of claim 2 further comprising:

calculating location information from said GPS satellite data.

6. The method of claim 5 wherein said step of calculating location information further comprises:

calculating location information from said GPS satellite data after all GPS antennas of said GPS array have been sampled.

7. A device for detecting GPS satellite data from multiple directions comprising:

a GPS antenna array having multiple GPS antennas that are oriented in multiple directions;

a switch that is connected to said GPS antenna array;

a GPS receiver coupled to said switch that controls said switch such that said GPS receiver is connected to said multiple GPS antennas and determines which GPS antenna of said GPS antenna array is receiving said GPS satellite data and changes connections so that said GPS antenna is connected to said GPS receiver and switching to additional antennas to acquire additional GPS satellite data;

a storage device that stores said GPS satellite data and said additional GPS satellite data.

8. The device of claim 7 wherein said GPS receiver further comprises:

a controller that is coupled to said switch to control said switch to successively connect each antenna of said multiple GPS antennas to said GPS receiver for as long as GPS satellite data is being acquired by each said antenna.

9. The device of claim 8 wherein said switch comprises a radio frequency relay array.

10. The device of claim 8 wherein said controller comprises a microprocessor.

* * * * *